Figure 1:
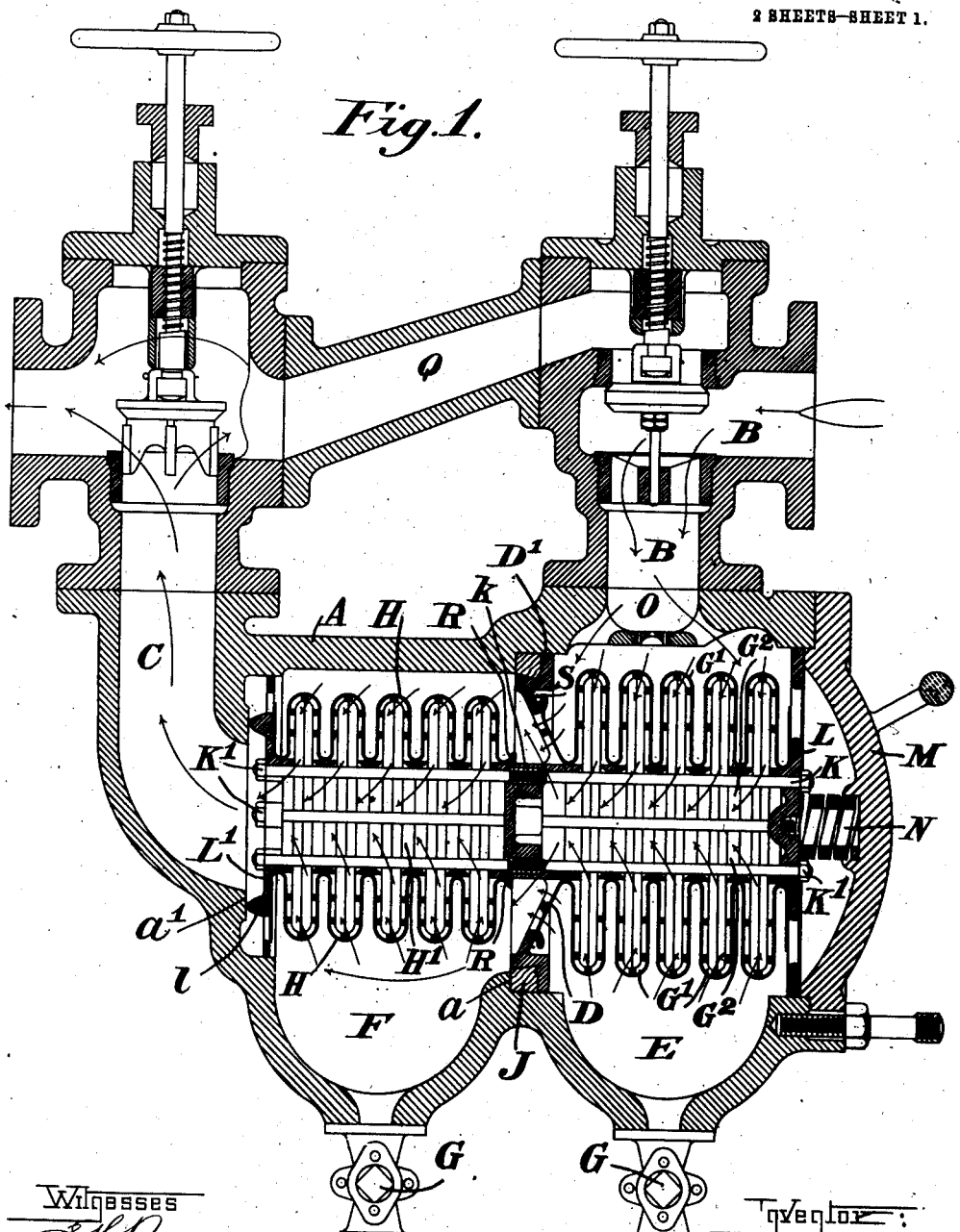

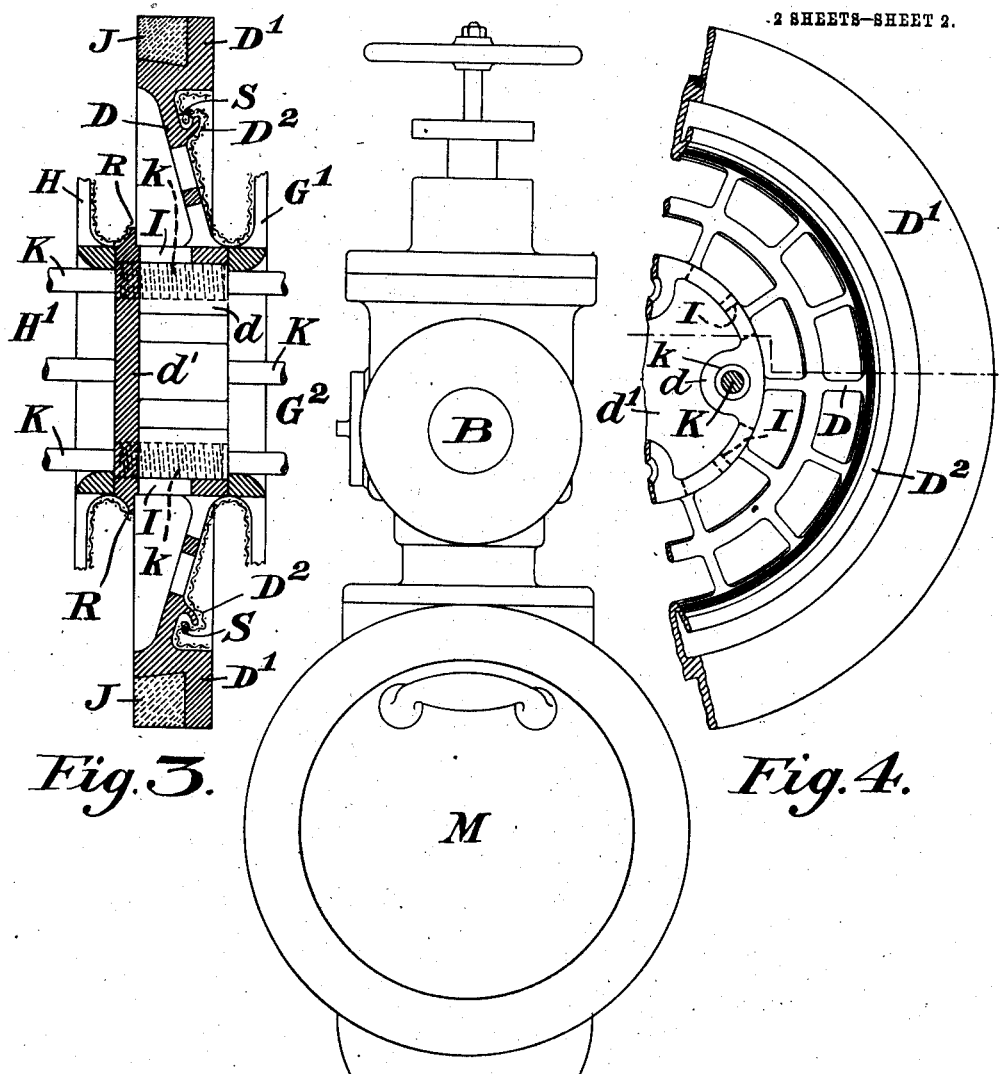

UNITED STATES PATENT OFFICE.

RICHARD CAMPBELL, OF LIVERPOOL, ENGLAND.

WATER-FILTER.

1,093,684. Specification of Letters Patent. Patented Apr. 21, 1914.

Application filed December 13, 1910. Serial No. 597,102.

*To all whom it may concern:*

Be it known that I, RICHARD CAMPBELL, a subject of the King of Great Britain, residing at Liverpool, in the county of Lancaster, England, have invented certain new and useful Improvements in Water-Filters, of which the following is a specification.

This invention relates to improvements in apparatus for filtering and purifying water for feeding boilers and other purposes. It has reference to that type of filter wherein there is a containing chest with two or more filtering chambers and a filtering body in each, so arranged that the filtering body in one chamber will do the first filtration and the partly purified water is then passed through the subsequent filtering body or bodies to complete the filtration.

According to my present invention, I make the filtering body in each chamber of a corrugated cylinder, of the type referred to in Letters Patent No. 555,020, issued under date of February 18, 1896, to William Railton jointly with myself. These corrugated cylinders, while occupying very little more space than a plain cylinder or cylinders, are much more efficient, since by reason of the corrugations a greatly increased filtering area is afforded. Furthermore, in order to prevent the filtering bodies getting choked with impurities, and avoid too frequent renewal and cleaning, I prefer to arrange the filtering bodies horizontal, and provide means in each chamber to collect the impurities that drop off the corrugated cylinders. By providing an arrangement of this kind, the filter can remain in use for a much longer period before opening it for cleaning purposes, and the impurities can be automatically discharged from the chambers while the filter is actually in use.

A further feature of the invention is that the filtering bodies in the chambers are joined together, so that when the lid is taken off, both or all can be removed as a whole at one end at the same time.

These and other improvements will be understood from the following description, reference being had to the accompanying drawings, which show the invention as applied to marine feed water filters.

Figure 1 is a longitudinal section; Fig. 2, an end view; Fig. 3, a longitudinal section on an enlarged scale of the partition; and Fig. 4, a face view thereof.

In these figures A is the chest or casing of the filter having an inlet B for the unpurified water and an outlet C for the purified water. This chest or casing A is divided by a removable diaphragm or partition D into two chambers E and F, the bottom of each chamber being formed hopper-shaped in which impurities will collect and can be removed from time to time by drain cocks G at the bottom. The inlet B communicates with one chamber E and the outlet C with the other chamber F. In the one chamber is placed a filtering shell G' formed with flannel-covered corrugations or rings, which collectively form a corrugated cylinder, and in the other chamber another similar filtering shell H. These filtering shells are placed in the path of the water, so that water from the inlet B is forced to pass first through the filtering walls of the shell G' into the interior $G^2$ thereof, thence through passages in the partition into the second chamber F on the outside of the second shell H, then through its corrugations into the interior H', and so to the outlet C, and thus a double filtration of the liquid takes place. By this means the filtering area is greatly increased, while occupying very little more space, and furthermore the arrangement enables me to have a coarse filtering medium on the one filtering shell G' to separate the coarser impurities from the water, and finer cloths on the other shell H to effect the final filtration of the water and free it from the finer impurities which have escaped through the walls of the other filtering shell.

The partition between the two chambers, consists of a diaphragm D having a tubular center boss $d$ closed at one end $d'$, and open at the other, from the outside of which boss $d$, the diaphragm D radiates obliquely in such a manner as to leave a port or ports I between it and the closed end $d'$ of the boss $d$. The outer perimeter of the diaphragm D is provided with a flange D', against which and the perimeter there is seated a rubber ring J, which latter seats itself against a shoulder $a$ between the two hopper shaped cavities of the chests E F. The respective shells each embody a corrugated chamber or a cylinder built up of perforated flanged rings or segments secured together (and collectively forming a corrugated cylinder, i. e. a cylinder with a series of external channels alternating with internal ones). At one end each shell abuts against the opposite ends of the tubular boss $d$, of the partition D, the bore of the boss $d$ and the bore of the corrugated shells G' and H being identically the same, so that one will form as it were, a continuation of the other. The tubular boss can be jointed to the ends of the shells by flanges if desired. The boss $d$ carries four or any suitable number of bolts K, the said bolts being provided with a screwed part $k$ at or about mid length, which is screwed into screw-threaded holes in the boss $d$, so that the bolts project at each side through the bore $G^2$ H' of the shells, and the several rings which collectively form the two shells can thus be bolted together and to the central boss $d$ of the partition when the nuts K' at the two ends of the bolts K are screwed up. At the outer end, the first shell is secured by the bolts to an end plate L which is seated against the door lid M of the chest, and between this end plate and the lid is a strong helical spring N. This plate L closes the bore of the shell G' at that end. At the outer end the second shell is bolted to an annular end plate L' arranged to form a water-tight joint with the end of the chest; thus for example, there may be an annular rib $l$ on the end plate L' which seats itself against seating $a'$ at that end of the chest. The filtering shells are forced by the helical spring N in one direction so that the partition will make a liquid tight joint against the shoulder $a$, and effectively separates the chest into two chambers. The said spring N also forces the rib on the end plate L' of the second shell against the seating $a'$ at the end of the chest, and makes a liquid tight joint there. So long therefore as the door M is bolted up, joints are made, which prevent the unfiltered water penetrating into the delivery side of the filter, without penetrating the filtering flannels. A distributer O is provided above the first shell to distribute the water over its corrugations.

The mode of action is as follows:—The water under pressure entering through the inlet conduit B is distributed over the outside of the corrugations of the first shell G', and percolates through the filtering surface thereof, leaving the coarser impurities, grease, et cetera, behind on the filtering flannels. The partly purified water then flows through the bore $G^2$ of shell G' into the hollow boss $d$ of the partition, but is here stopped from flowing direct into the bore of the other shell by the closed end $d'$ of the boss, and so is deflected by the ports I into the second chamber F of the chest, and is distributed over the outside of the corrugations of the second shell H. The water percolates through this into its interior or bore H', and in so doing is further purified, the purified water being finally delivered through the bore of the annular end plate L' to the outlet conduit C, the impurities having been arrested by the filtering flannels of the second shell H. The construction is such that no water can penetrate into the outlet conduit C of the filter from the inlet conduit B, except by first passing through the filtering flannels of both shells G' and H, thus securing a double filtration. The usual by-pass Q can however be provided and is brought into use when required. The impurities collecting on the outside of the shells falls into the trough shaped containers at the bottom of the chambers E and F from whence they are removed from time to time, while the filter is in use, by opening the drain cocks G. The shells G' and H being by preference horizontally placed, instead of vertically one above the other, admit of this collection of impurities which otherwise might choke the shells. By removing the lid M both filtering shells can be removed as a whole and not separately.

One face of the partition D is formed with a curved flange $D^2$ forming a groove. This serves for securing one end of the filtering cloth or flannel of one shell. The end of the cloth is placed in the groove $D^2$ and tied around with wire or cord S to secure it, and the cloth throughout its length made to conform to the corrugations of the shell, and tied down in the corrugations if desired. The partition D can be perforated also, as well as the shells, provided the filtering cloth covers the perforations thereof. The end of the filtering cloth for the second shell is tied down in a groove R formed by the opposing ends of the shell H and boss $d$.

The shells can easily be removed from the chest for cleaning, by taking off the lid M, and both shells with the center partition D can then be drawn out.

I do not confine myself to two chambers with a filtering shell in each, as if desired three or more can be provided and the water made to pass through each in turn. Also each shell can be made in one piece, instead of being built up of separate rings.

I declare that what I claim is:—

1. In a filter, the combination of a chest or casing provided with two chambers, one chamber being provided with an inlet opening and the other with an outlet; and a filtering member removable as a whole and adapted to be mounted in said chest, said member comprising a centrally-disposed diaphragm having openings or passages extending therethrough, shells secured to and carried by said diaphragm upon opposite sides thereof, a filtering medium mounted upon each of said shells, and means for securing said diaphragm and shells in position.

2. In a filter, the combination of a chest or casing, provided with two intercommunicating chambers; an inlet opening into one chamber and an outlet extending from the other; a diaphragm adapted to be seated between the two chambers, said diaphragm having openings or passages extending therethrough; filtering shells secured to said diaphragm, one upon each side thereof; a filtering cloth secured upon each shell, the cloth of one shell overlying the openings in the diaphragm; and means for securing the diaphragm and shells in position within the chest or casing.

3. In a filter, the combination of a chest or casing provided with two chambers; an inlet opening into one chamber and an outlet extending from the other; a diaphragm adapted to make a close joint with the walls of the chest or casing between the two chambers, said diaphragm being provided with a series of openings extending therethrough; a pair of filtering shells secured to the diaphragm, one upon each side thereof; a groove formed upon each side of the diaphragm; a filtering cloth secured upon each shell and terminating at one end in one of the grooves, where it is secured, one of said cloths overlying the opening in the diaphragm; and means for securing the diaphragm and shells in position in the chest or casing.

4. In a filter, the combination of a chest or casing provided with two chambers, one having an inlet and the other an outlet opening; a diaphragm adapted to make close contact with the walls of the chest or casing between the two chambers, said diaphragm having openings or passages extending therethrough; filtering elements carried by said diaphragm, one in each chamber, said diaphragm and filtering elements being removable as a unit; and a distributer located in the inlet opening leading to the first chamber and serving to distribute fluid in the first chamber, so as to cause an even action over the entire filtering element therein.

5. In a filter, the combination of a chest or casing provided with two alined chambers; an inlet opening into one and an outlet extending from the other of said chambers; a filtering member adapted to be mounted in said chambers, said member comprising a diaphragm carrying a packing ring, said ring being adapted to make close contact with the walls of the chest or casing between the two chambers, said diaphragm having openings extending therethrough between the periphery and a central solid boss formed as an integral portion of the diaphragm, said diaphragm being likewise provided with a groove or curved flange extending around the forward face thereof at a distance from the center greater than the openings formed in the diaphragm, a plurality of bolts extending from the diaphragm to each side thereof, a pair of end plates one for each chamber, a corrugated ring-shaped member mounted upon the bolts to each side of the diaphragm and between it and the end plates, and filtering cloths mounted upon said ring-shaped members, secured thereto and to the diaphragm; and means for securing the filtering member thus composed in position within the chest or casing.

6. In a filter, the combination of a chest provided with two intercommunicating chambers, one chamber being provided with an inlet opening and the other with an outlet; a diaphragm having openings therein and adapted to make close contact with the walls of the chest between the two chambers; a hollow filtering shell for each chamber, said shells being connected to and separated by the diaphragm, the fluid passing from the interior of the first shell, through the openings in the diaphragm, and to the exterior of the second shell; and means for securing said shells and the diaphragm as a unit in position within the chest.

In witness whereof, I have hereunto signed my name this 29th day of November 1910, in the presence of two subscribing witnesses.

R. CAMPBELL.

Witnesses:
  G. C. Dymond,
  H. I. Shovbridge.